Figure 1:
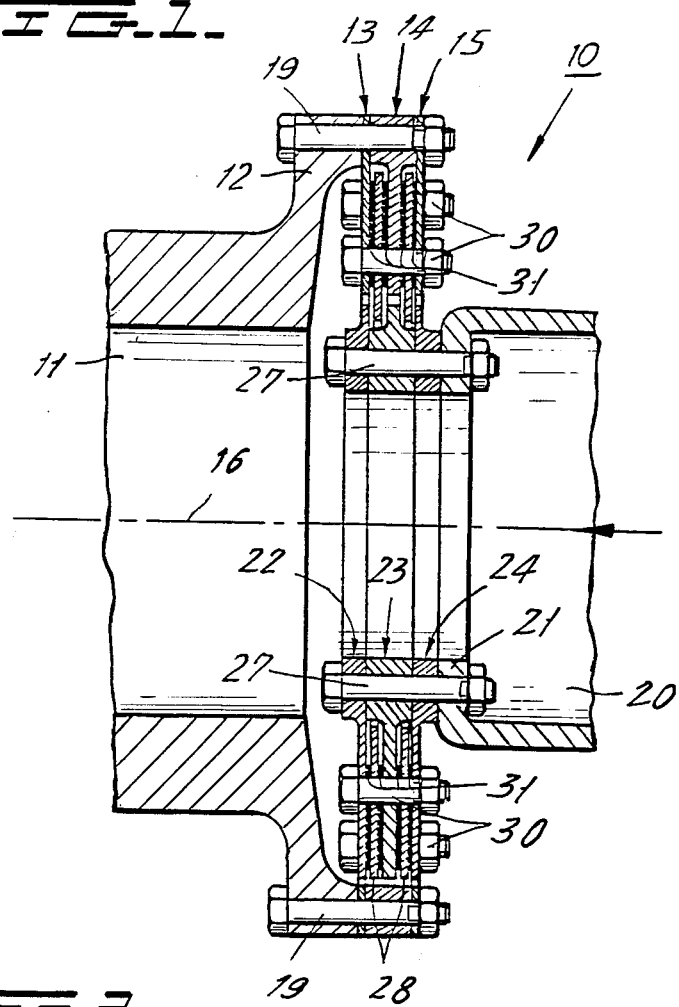

United States Patent [19]
Federn

[11] Patent Number: 4,741,722
[45] Date of Patent: May 3, 1988

[54] TORSIONALLY RIGID, ELASTICALLY FLEXIBLE SHAFT COUPLING

[76] Inventor: Klaus Federn, Dachsberg 14, D-1000 Berlin 33, Fed. Rep. of Germany

[21] Appl. No.: 855,820
[22] PCT Filed: May 13, 1985
[86] PCT No.: PCT/DE85/00162
  § 371 Date: Mar. 7, 1986
  § 102(e) Date: Mar. 7, 1986
[87] PCT Pub. No.: WO85/05419
  PCT Pub. Date: Dec. 5, 1985

[30] Foreign Application Priority Data
May 14, 1984 [DE] Fed. Rep. of Germany ....... 3417803

[51] Int. Cl.⁴ ............................................. F16D 3/79
[52] U.S. Cl. ........................................ 464/99; 464/98
[58] Field of Search .............. 464/69, 92, 93, 94, 464/96, 98, 99, 100

[56] References Cited
U.S. PATENT DOCUMENTS

| | | |
|---|---|---|
| 1,091,809 | 3/1914 | Callan ................................ 464/69 |
| 1,454,087 | 3/1923 | Thomas ............................... 464/99 |
| 1,455,242 | 5/1923 | Corgiat, Jr. et al. ................. 464/99 |
| 1,460,212 | 6/1923 | Olive ................................. 464/98 |
| 2,182,711 | 12/1939 | Thomas . | 
| 2,430,449 | 11/1947 | Brown ................................ 464/99 |
| 3,654,775 | 4/1972 | Williams ........................ 464/99 X |
| 3,808,837 | 5/1974 | Anderson et al. ................... 464/99 |
| 3,985,000 | 10/1976 | Hartz ................................ 464/99 |
| 4,011,021 | 3/1977 | Hartz ............................ 464/96 X |
| 4,044,571 | 8/1977 | Wildhaber ..................... 464/99 X |
| 4,133,187 | 1/1979 | Wildhaber ..................... 464/99 X |

FOREIGN PATENT DOCUMENTS

| | | |
|---|---|---|
| 82797 | 6/1983 | European Pat. Off. ............. 464/99 |
| 646631 | 11/1928 | France . |
| 1361493 | 4/1964 | France . |

Primary Examiner—Daniel P. Stodola
Attorney, Agent, or Firm—Ostrolenk, Faber, Gerb & Soffen

[57] ABSTRACT

In a torsionally rigid, elastically flexible shaft coupling having at least one elastic disk disposed at right angles to the axis of rotation, cams on both coupling halves act alternately on both sides of the disk. In order to improve the loading capacity of the connection of the disk with the cams of both coupling halves by a multi-section design of this connection and in order to increase the transmitting capacity and the flexibility, the shaft coupling has the following characteristics:
(a) the disk is constructed as a ring,
(b) the points of application of the cams of both coupling halves on the annular disk lie at least approximately on one radius, the said cams surrounding the annular disk on both sides.

5 Claims, 2 Drawing Sheets

TORSIONALLY RIGID, ELASTICALLY FLEXIBLE SHAFT COUPLING

The invention relates to a torsionally rigid, elastically flexible shaft coupling having at least one elastic disk disposed at right angles to the axis of rotation on which cams of both coupling halves act.

Such a shaft coupling is known from German Gebrauchsmuster No. 73 21 095. There a disk made of stratified membranes is used as an elastic transmission element between two coupling halves. Cams on one coupling half act on both sides from the inner edge of the membrane package. Here one cam is constructed as a collar on the coupling half, while the other cam, designed as an annular disk, sits torsionally rigidly on a journal of this coupling half. The cams of this coupling half and the membrane package are frictionally and form-locking connected by means of through-screws. In this way a double-shear fastening of the membrane package to this coupling half is achieved.

The outer edge of the membrane package of the known shaft coupling is surrounded by cams of the other coupling half. The connection between these cams and the membrane package is produced here by rivets. However, because only the cams acting on one side of the membrane package are connected in a torsionally rigid manner to the assigned coupling half, there is only single-shear fastening of the membranes to the coupling half. By the double-shear fixing at the inner edge and the single-shear fixing at the outer edge of the membrane package, allowances are made for the variable large forces acting on various radii. However there is unharmonic transmission of the forces between their points of application on the membrane package. The membrane package, which is tangentially stressed thereby, is overdimensioned in its cross-section with regard to the lower forces acting on the outer edge of the membrane package. This, however, results in a higher bending resistance for the membrane package.

The object of the invention is to increase the loading capacity of a shaft coupling with improved flexibility.

This object is solved in the present invention by providing a flexible annular elastic disk or ring and arranging the points of application or fastening of the cams of both coupling halves which enclose both sides of the ring to lie at least approximately on one radius.

The solution is advantageous insofar that a torque is transmitted by forces from the cams of one coupling half to the flexible annular disk and from this to the cams of the other coupling half on one radius. The forces acting at the points of application of the cams are therefore the same size and the annular disk is subject to substantial compression stress and tensile stress. On the basis of this regulated transmission of force, the annular disk is uniformly stressed, so that, in comparison with the state of the art, it can have a smaller cross-section with the same transmitting capacity and improved flexibility. The transmitting capacity of the coupling is substantially increased in comparison with the known design by the multi-shear fixing of the cams of both coupling halves to the elastically flexible annular disk on a comparatively large radius.

Advantageous refinements of the invention are described below.

The cams of one coupling half are formed as radially inwardly extending tongue-like plates that extend inward from the external mounting periphery of the one coupling half. The cams of the other coupling half are formed as radially outwardly extending tongue-like plates that extend outwardly from the internal mounting periphery of the other coupling half. The tongue-like plates overlap, in the direction of the related coupling half, into a closed circular ring concentric to the axis of rotation. This ensures that cams are very strong while simultaneously decreasing their mass enabling them to surround the annular disk on both sides.

Additional refinements of the invention may be included to increase the multiple-shearing of the connection between the annular disks or annular disk packages respectively and the cams. Such refinements may include providing at least two annular disks and having one cam of each coupling half disposed between individual disks. Also, annular disks may be arranged in packages and the coupling halves may act on both sides, at the front of the individual disk packages.

Cams may be provided which act at a smaller radius on the associated coupling half than on the annular disks, and those cams interlock with their respective coupling half by toothing between them. This ensures the transmission of particularly high forces onto a small radius.

The plates of both sets of cams and the annular disk(s) may be penetrated by a shoulder sleeve in which one screw braces the plates and comes between the shoulder of the sleeve and the disk. This operates to decrease the notch effect between the cams and the annular disk(s) if a part of the torque is transmitted form-locking when the frictional contact is exceeded.

Two exemplified embodiments of the invention are explained in more detail below by the means of drawings. They show:

FIG. 1 a cross-section through a shaft coupling disposed between two coupling halves as the first exemplified embodiment, the said shaft consisting substantially of cams for the two coupling halves and annular disks disposed between them as the elastic transmission element.

Figure 2:
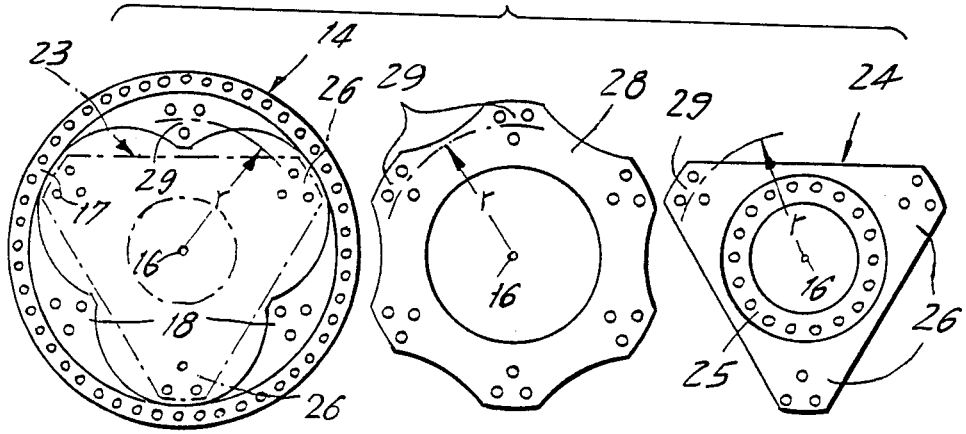
Figure 3:
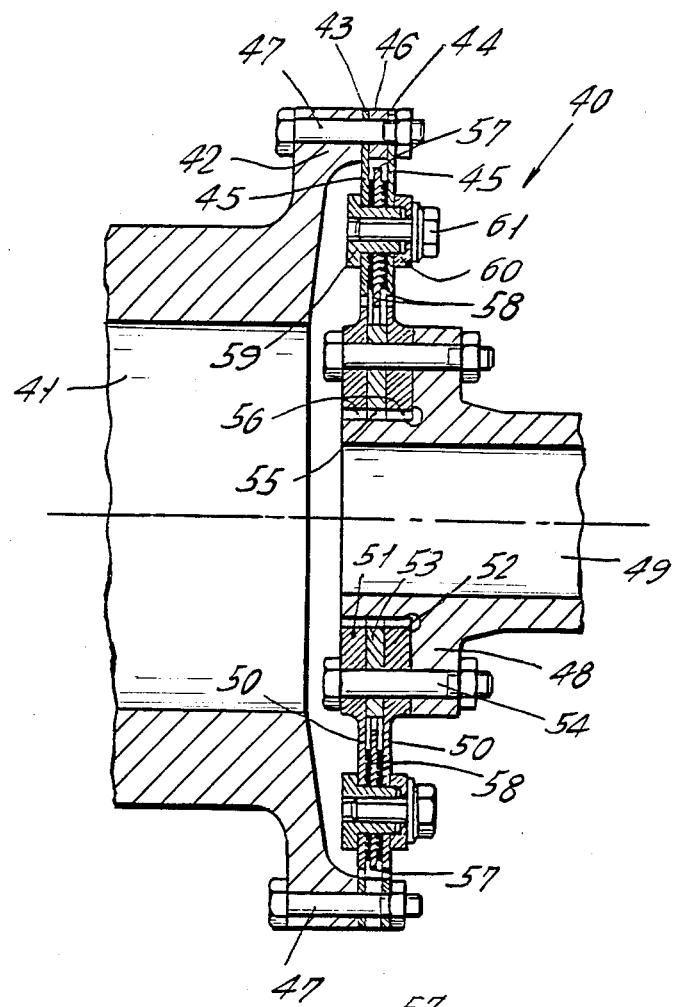

FIG. 2 a view seen in the direction of arrow II in FIG. 1 of one cam respectively of the corresponding coupling half having an interposed annular disk, on a smaller scale than in FIG. 1, and FIG. 3 a cross-section of a similar shaft coupling, having only one annular disk, as the second exemplified embodiment, in which the cams are also connected to the inner coupling half in a form-locking manner.

Figure 4:
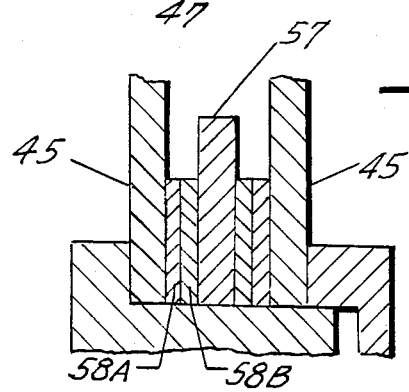

FIG. 4 is a fragmentary cross-section of FIG. 3, showing an alternate embodiment.

The first exemplified embodiment, shown in FIGS. 1 and 2, of a torsionally rigid, elastically flexible shaft coupling 10, has a coupling half 11 having a flange with a large diameter. Three cams 13, 14 and 15 are congruently attached to this flange 12 on the front side. As FIG. 2 shows on the left with the example of cam 14, the cams 13, 14 and 15 are constructed as closed rings 17 passing concentrically to the axis of rotation 16 of the shaft coupling 10. From these proceed three tongue-shaped plates 18 extending radially against the axis of rotation 16 with uniform spacing of 120°. The two cams 13 and 15 are of the same thickness both in the region of the ring 17 and also of plates 18. The ring 17 of the cam 14 is strengthened in its cross-section on both sides of its plate 18, so that there remains a gap of corresponding thickness between the plates 18 of the stacked cams 13 to 15. However, deviating from the exemplified embodiment described, the cam 14 may also consist of one or two cams 13 or 15 with a similar shape, to which spacer rings of corresponding width are attached. The cams 13 to 15 are connected to the flange 12 of coupling half 11 by means of through-screws and tight-fit screws 19.

The second coupling half 20 of the shaft coupling 10 has a flange 21 with a smaller diameter than that of the other coupling half 11. To the flange 21 are attached cams 22, 23, and 24 which are congruent and disposed concentrically to the axis of rotation 16. The cam 24, shown on the right in FIG. 2, of coupling half 20 has a closed annular shape 25, from which issue three plates 26 passing radially outwards with uniform spacing of 120°. The two other cams 22 and 23 are also designed accordingly. The cams 22 to 24 are screwed in a torsionally rigid manner with through-screws and tight-fit screws 27 to the flange 21 of coupling half 20.

As FIG. 1 clearly shows, the plates of cams 13 to 15 and 22 to 24, which extend in the same radial plane respectively, have a cross-section of the same width. Moreover, the plates 18 and 26, mutually offset in the peripheral direction by 60°, of the respectively assigned cams 13 and 22 or 14 and 23 or 15 and 24 respectively of the two coupling halves 11 and 20 interlock with mutual play, as shown on the left in FIG. 2 by the dash-dot line in a simplified way for cams 14 and 23.

Elastic annular disks 28 are inserted as transmission elements for the two coupling halves 11 and 20 between plates 18 and 26 respectively of the corresponding cams, the cross-sections of said plates being adjacent. The thin-walled annular disks 28 are essentially ring-shaped (FIG. 2). They are provided with groups of three bores 29 with a spacing of 60°. Between these groups of bores 29 the cross-section of the annular disks 28 is radially tapered. The groups of bores 29 lying on an average radius r are also present in plates 18 and 26 of cams 13 to 15 and 22 to 24. The bores 29 receive through-screws 30 for the torsionally rigid connection of the annular disks 28 to the cams 13 to 15 and 22 to 24 of the two coupling halves 11 and 20, in each bore group respectively at least one screw being constructed as a tight-fit screw or being surrounded by a fitted sleeve (not shown). Here washers 31 designed accordingly are inserted on both sides of the annular disks 28 (black cross-sections in FIG. 1). These may consist of a material having a smaller E modulus than the annular disks. They may be connected to the annular disks by glueing or soldering to reduce the clamping notch effect. Instead of the washers, the annular disks in the clamping area may also be strengthened axially with a gradual transition to the elastically flexible area (not shown).

In the second exemplified embodiment of a shaft coupling 40 shown in FIG. 3, only two cams 43 and 44 are fastened with plates 45 to its one coupling half 41 at the flange 42 having a large diameter. These cams correspond to cams 13 and 15 of the first exemplified embodiment. Between the cams 43 and 44 is inserted a spacer ring 46. These three components are held by means of screw connections 47 to the flange 42 by friction contact.

Two cams 51 and 52 having plates 50 and with an interposed spacer ring 53 are fastened to the small-diameter flange 48 of the other coupling half 49 by means of screw connections 54. The cams 51 and 52 correspond to the external cams 22 and 24 of the first exemplified embodiment. As the fastening of the cams 51 and 52 to the flange, which is to be regarded as single-shear, occurs on a relatively small radius, in some circumstances the friction contact achieved by the screw connection 54 may not suffice for the transmission of a high torque. Therefore in the region of the cams 51 and 52, the coupling half 49 is provided with external toothing 55, and the cams are each provided with internal toothing 56 on their inner edge. This toothing is in the form of a gear wheel. This additional form-locking may also be achieved by radial serrations on the front sides of the cam 52 and of the flange 48 of the coupling half 49 turned towards one another (not shown). Furthermore, fitted bolts, cylindrical pins, etc are suitable as further form-locking elements connecting the cams of both coupling halves with the respective coupling flange. An increase in the transmitting capacity is possible by improving the friction contact, e.g. by means of a flat thread or suitable profiling of the components assigned to one another.

Between the plates 45 and 50 of the cams 43, 44 and 51, 53 of both coupling halves 41 and 49, which are in the same respective planes, is inserted as the transmission element just one elastic annular disk 57, which corresponds to one of the disks 28 of the first exemplified embodiment. By this the shaft coupling 40 is more flexible than such a coupling having transmission elements disposed with mutual axial spacing. However, a package of annular disks (shown in FIG. 4) may also be used instead of an annular disk.

The annular disk 57 is connected in the peripheral direction alternately with the plates 45 of the cams 43, 44 or plates 50 respectively of cams 51, 52 by interposing washers 58 (black cross-section). For this purpose these components are penetrated by one shoulder sleeve 59 respectively, which engages with its end section turned away from the shoulder in a disk 60. The shoulder sleeve 59 and the disk 60 are braced by a screw 61 to achieve the required friction contact between the cams 43, 44 or 51, 52 respectively and the annular disk 57. Instead of the connection described, a screw coupling formed by a tight-fit pin with a nut may also suffice.

The shaft coupling according to the invention may also be provided with a larger number of annular disks 58A and 58B, shown in FIG. 4, in contrast with the two exemplified embodiments. These may be inserted as a package layered between the plates of the cams. With the arrangement of a larger number of annular disks or annular disk packages with mutual spacing, the number of cams is to be increased accordingly by one between each pair of disks. Plates or packages of plates, which are combined to form a ring, may also be used as transmission elements.

What is claimed is:

1. A torsionally rigid, elastically flexible shaft coupling comprising: a first and a second coupling half;
   at least one annular elastic disk arranged between the coupling halves at a right angle to the axis of rotation of the coupling;
   a respective plurality of cams affixed to each of the coupling halves and being formed with radially extending tongue-shaped protruding plates, the cams of each coupling half being arranged to enclose both axial sides of the annular disk; the tongue-shaped protruding plates of each cam affixed to one coupling half being arranged in intermeshing radial alignment with the protruding plates of a corresponding cam affixed to the other coupling half so that the protruding plates are fastened to the disk at a respective plurality of circumferential locations around the disk at least approximately on a single radius;

the cams of one of the coupling halves extending, from their respective locations of fastening on the elastic disk, radially inwardly to a first closed circular ring concentric with the axis of rotation and disposed radially inwardly of the space defined by the annular disk;

the cams of the other coupling half extending, from their respective locations of fastening on the elastic disk, radially outwardly to a second closed circular ring concentric with the axis of rotation and disposed radially outwardly of the space defined by the annular disk.

2. Shaft coupling according to claim 1, having at least two annular disks and one cam respectively of both coupling halves being disposed between the individual annular disks.

3. Shaft coupling according to claim 1, wherein each annular disk is an annular disk package of parallel elastic disks.

4. Shaft coupling according to claim 1, wherein the cams of the one coupling half include form-locking means at the inner periphery thereof for engaging form-locking means on the one coupling half.

5. Shaft coupling according to claim 1, further comprising a shoulder sleeve penetrating the plates of the cams and the annular disks, and a screw for bracing the cams between the shoulder of the sleeve and the disk.

* * * * *